US010175422B2

(12) United States Patent
Dong et al.

(10) Patent No.: US 10,175,422 B2
(45) Date of Patent: Jan. 8, 2019

(54) MODULAR OPTICAL DEVICE AND MODULES THEREFOR

(71) Applicants: Alcatel-Lucent USA Inc., Murray Hill, NJ (US); Alcatel-Lucent Bell Labs France, Boulogne-Billancourt (FR)

(72) Inventors: Po Dong, Morganville, NJ (US); Gabriel Charlet, Antony (FR)

(73) Assignees: Alcatel-Lucent USA Inc., Murray Hill, NJ (US); NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/483,084

(22) Filed: Apr. 10, 2017

(65) Prior Publication Data

US 2018/0292607 A1    Oct. 11, 2018

(51) Int. Cl.
*G02B 6/12* (2006.01)
*G02B 6/126* (2006.01)
(Continued)

(52) U.S. Cl.
CPC ..... *G02B 6/12004* (2013.01); *G02B 6/12002* (2013.01); *G02B 6/126* (2013.01);
(Continued)

(58) Field of Classification Search
None
See application file for complete search history.

(56) References Cited

U.S. PATENT DOCUMENTS 7,021,833 B2   4/2006 Loh et al.
7,428,358 B2   9/2008 Lu et al.
(Continued)

OTHER PUBLICATIONS

Doany, Fuad E., et al., "Dense 24 TX+24 RX fiber-coupled optical module based on a holey CMOS transceiver IC," Proceedings 60th Electronic Components and Technology Conference (ECTC), 2010, Abstract (8 pages).
(Continued)

*Primary Examiner* — Sung Pak
(74) *Attorney, Agent, or Firm* — Mendelsohn Dunleavy, P.C.; Yuri Gruzdkov

(57) ABSTRACT

A modular optical device having a set of optoelectronic modules that enables the device to operate, e.g., as a WDM or multichannel transceiver. In an example embodiment, the set of optoelectronic modules includes a laser module, a modulator module, and an optical-to-electrical converter module, all mounted on the same circuit board and optically and electrically connected for the intended application. Each of the optoelectronic modules comprises a respective stack of integrated circuits, at least one of which is a photonic integrated circuit (PIC). Some of the PICs may be configurable for different applications, with the configuration setup being carried out using electrical control signals and/or optical connections of the PICs. The modular structure of the device enables the manufacturer to provide customized solutions to different customers according to their respective specifications while using the same device architecture and/or to interchangeably use parts obtained from different suppliers to engineer those solutions.

18 Claims, 7 Drawing Sheets

(51) Int. Cl.
  *H04B 10/532* (2013.01)
  *H04B 10/54* (2013.01)
  *H04B 10/50* (2013.01)
  *H04B 10/516* (2013.01)
  *H04B 10/66* (2013.01)
  *H04B 10/61* (2013.01)
  *H04J 14/06* (2006.01)

(52) U.S. Cl.
  CPC .............. *G02B 2006/12121* (2013.01); *G02B 2006/12123* (2013.01); *G02B 2006/12142* (2013.01); *H04B 10/503* (2013.01); *H04B 10/5161* (2013.01); *H04B 10/532* (2013.01); *H04B 10/54* (2013.01); *H04B 10/61* (2013.01); *H04B 10/66* (2013.01); *H04J 14/06* (2013.01)

(56) References Cited

U.S. PATENT DOCUMENTS

| | | |
|---|---|---|
| 7,625,771 B2 | 12/2009 | Joyner et al. |
| 8,494,315 B2 | 7/2013 | Dupuis et al. |
| 9,071,364 B1 | 6/2015 | Voois et al. |
| 9,176,291 B2 | 11/2015 | Li et al. |
| 9,383,516 B2 | 7/2016 | Celo |
| 2006/0177173 A1 | 8/2006 | Shastri et al. |
| 2010/0215314 A1 | 8/2010 | Lau et al. |
| 2013/0209020 A1 | 8/2013 | Doerr et al. |
| 2014/0044389 A1 | 2/2014 | Uemura et al. |
| 2014/0161394 A1 | 6/2014 | Ho et al. |
| 2014/0376001 A1 | 12/2014 | Swanson |
| 2016/0105247 A1* | 4/2016 | Cheng .................. H01L 31/173 250/551 |
| 2016/0116688 A1 | 4/2016 | Hochberg et al. |
| 2016/0161685 A1 | 6/2016 | Xu et al. |
| 2017/0279537 A1* | 9/2017 | Kim ..................... H04B 10/572 |
| 2017/0285263 A1* | 10/2017 | Pinguet ................. G02B 6/124 |
| 2017/0299809 A1* | 10/2017 | Boeuf ................ G02B 6/12004 |
| 2017/0307824 A1* | 10/2017 | Usami ............... G02B 6/12004 |

OTHER PUBLICATIONS

Doerr, C., et al., "Singlechip silicon photonics 100Gb/s coherent transceiver," Optical Fiber Communications Conference and Exhibition (OFC), 2014, Abstract (3 pages).

Dong, Po, "Photonic Integrated Circuit Having a Relative Polarization-Rotating Splitter/Combiner," U.S. Appl. No. 15/475,805, filed Mar. 31, 2017 (25 pages).

International Search Report and Written Opinion; dated Jul. 25, 2018 for PCT Application No. PCT/US2018/026737.

* cited by examiner

100

500

600

700

MODULAR OPTICAL DEVICE AND MODULES THEREFOR

BACKGROUND

Field

The present disclosure relates to optical communication equipment and, more specifically but not exclusively, to modular optical devices and modules therefor.

Description of the Related Art

This section introduces aspects that may help facilitate a better understanding of the disclosure. Accordingly, the statements of this section are to be read in this light and are not to be understood as admissions about what is in the prior art or what is not in the prior art.

Optical transport systems typically employ optical transmitters and receivers. Due to their importance to these systems, methods and apparatus that facilitate their production and deployment in a cost-effective manner are desirable.

SUMMARY OF SOME SPECIFIC EMBODIMENTS

Disclosed herein are various embodiments of a modular optical device having a set of optoelectronic modules that enables the device to operate, e.g., as a wavelength-division-multiplexing transceiver, a multichannel transceiver, or a set of single-channel transceivers. In an example embodiment, the set of optoelectronic modules includes a laser module, a modulator module, and an optical-to-electrical converter module, all mounted on the same circuit board or carrier and optically and electrically connected for the intended application. Each of the optoelectronic modules comprises a respective stack of integrated circuits, at least one of which is a photonic integrated circuit (PIC). Some of the PICs may be configurable for different applications, with the configuration setup being carried out using electrical control signals and/or optical connections of the PICs. The modular structure of the device advantageously enables the manufacturer to provide customized solutions to different customers according to their respective specifications while using the same device architecture and/or to interchangeably use parts obtained from different suppliers to engineer the customized solutions.

In some embodiments, a laser module and a modulator module can be combined into a single module. In some other embodiments, a laser module and an optical-to-electrical converter module can be combined into a single module. In still other embodiments, a modulator module and an optical-to-electrical converter module can be combined into a single module.

According to an example embodiment, provided is an apparatus comprising: a substantially planar substrate; a first optoelectronic module supported on the substantially planar substrate; and a second optoelectronic module supported on the substantially planar substrate. Each of the first and second optoelectronic modules comprises a respective stack of two or more electrically interconnected integrated circuits, each of the respective stacks including a respective photonic integrated circuit. The photonic integrated circuit of the second optoelectronic module is optically coupled to receive light generated by the photonic integrated circuit of the first optoelectronic module.

According to another example embodiment, provided is a method of making a modular optical device, the method comprising the steps of: mounting a first optoelectronic module on a substantially planar substrate; and mounting a second optoelectronic module on the substantially planar substrate; wherein each of the first and second optoelectronic modules comprises a respective stack of two or more electrically interconnected integrated circuits, each of the respective stacks including a respective photonic integrated circuit; and wherein the method further comprises optically coupling the photonic integrated circuit of the second optoelectronic module to receive light generated by the photonic integrated circuit of the first optoelectronic module.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
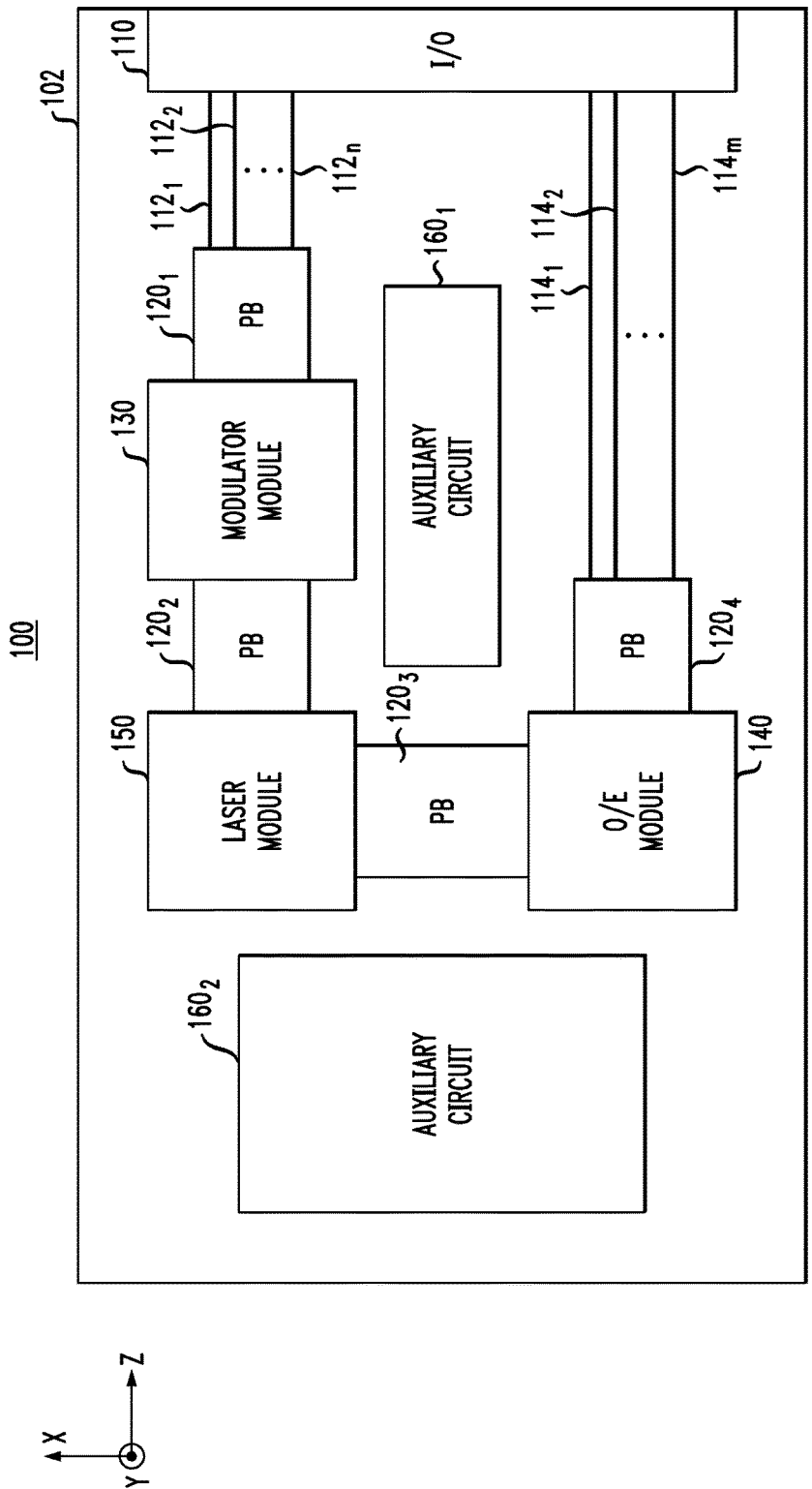
FIG. 1 shows a schematic top view of a modular optical device according to an embodiment.

FIG. 1 shows a schematic top view of a modular optical device 100 according to an embodiment. Device 100 comprises a substantially planar substrate (e.g., circuit board or carrier) 102 on which other components of the device are mounted in an electrically and/or optically interconnected manner. As used herein, the term "substantially planar" refers to the fact that the variation of the feature height and/or thickness across at least one surface of substrate 102 is significantly smaller (e.g., by a factor of ten or more) than the lateral size(s), e.g., length and width, of the substrate. The height and/or thickness are measured along the Y-coordinate axis of the XYZ coordinate system shown in FIG. 1. The lateral dimensions are measured in the XZ plane of that coordinate system.

Device 100 further comprises an optical input/output (I/O) coupler 110 through which light can be coupled in and out of the device's optical waveguides (e.g., fibers) $112_1$-$112_n$ and $114_1$-$114_m$, as known in the pertinent art. Waveguides $112_1$-$112_n$ connect I/O coupler 110 to a photonic bridge (PB) $120_1$ that is further optically connected to a modulator module 130 mounted on substrate 102. Waveguides $114_1$-$114_m$ similarly connect I/O coupler 110 to a photonic bridge $120_4$ that is further optically connected to an optical-to-electrical (O/E) converter module 140 mounted on substrate 102. Modulator module 130 and O/E module 140 are further optically connected, by way of photonic bridges 120$_2$ and 120$_3$, respectively, to a laser module 150 mounted on substrate 102.

In various embodiments, waveguides 112 and 114 can be implemented using optical fibers, fiber-optic cables, planar optical waveguide circuits or chips, and/or any combinations thereof.

In some embodiments, laser module 150 and modulator module 130 can be combined into a single module, in which case photonic bridge 120$_2$ is omitted. In some other embodiments, laser module 150 and O/E module 140 can be combined into a single module, in which case photonic bridge 120$_3$ is omitted. The combined module 150/130 or 150/140 can have a stack structure that can be analogous to any of those described below in reference to FIGS. 2-4.

In some alternative embodiments, modulator module 130 and O/E module 140 can be combined into a single module. The combined module 130/140 can have a stack structure that can be analogous to any of those described below in reference to FIGS. 2-4.

The operation of device 100 may be enabled and supported by one or more auxiliary electrical circuits 160, two of which (labeled 160$_1$ and 160$_2$) are shown in FIG. 1 for illustration purposes. In some embodiments, circuits 160$_1$ and 160$_2$ can be used to: (i) generate and supply to modules 130-150 one or more currents and/or voltages, e.g., for appropriately driving various components thereof; (ii) receive and process electrical signals generated by O/E module 140, e.g., in response to light received through one or more of optical waveguides 114$_1$-114$_m$; and/or (iii) provide appropriate electrical signals to modulator module 150 in response to which the latter can generate, e.g., modulated optical signals to be transmitted out through one or more of optical waveguides 112$_1$-112$_n$. In some embodiments, circuits 160$_1$ and 160$_2$ may include or be used to implement a digital signal processor and/or an electronic controller.

In an example embodiment, device 100 can be used to implement, e.g., an optical transceiver, such as a wavelength-division-multiplexing (WDM) transceiver, a parallel single-mode (PSM) transceiver, or a single-wavelength transceiver. A typical lateral size of each of modules 130-150 can be on the order of 1 cm×1 cm. Example embodiments of optoelectronic modules 130-150 that can be used in device 100 are described in more detail below in reference to FIGS. 2-7.

The indicated modular structure of device 100 advantageously enables the manufacturer to provide customized solutions to different customers according to their respective specifications while using the same device architecture and/or to interchangeably use parts obtained from different suppliers to engineer the customized solutions. For example, device 100 can be designed to have a substrate 102 suitable for mounting different embodiments of optoelectronic modules 130-150, as long as those optoelectronic modules have a standardized pitch and comply with thermal-density specifications of the device. Device 100 can also be designed to be technology-agnostic with respect to the specific platforms (e.g., InP, Si Photonics, SiGe, CMOS, etc.) used to implement some or all of optoelectronic modules 130-150.

In an example embodiment, a photonic bridge 120 can be an optical adapter/coupler designed and configured to transfer light between two geometrically dissimilar optical elements, circuits, or components, e.g., selected from the following non-exclusive list: (i) one or more photonic integrated circuits; (ii) one or more planar waveguides; (iii) one or more optical fibers; (iv) one or more fiber-optic cables; (v) one or more optical modules; and (vi) one or more optical ports or couplers. An example photonic bridge 120 can be implemented, e.g., using one or more of the following: (i) a set of free-space optical elements, such as lenses, mirrors, splitters, combiners, etc.; (ii) a micro-optic device; (iii) a photonic lightwave circuit; (iv) a 3-dimensional waveguide; (v) an optical bonding wire; (vi) one or more wavelength multiplexers; (vii) one or more wavelength de-multiplexers; (viii) one or more power splitters; (ix) one or more power combiners, etc. Some embodiments of a photonic bridge 120 can benefit from the use of optical devices disclosed, e.g., in U.S. Pat. Nos. 9,383,516, 9,176,291, 8,494,315, 7,625,771, 7,428,358, and 7,021,833, all of which are incorporated herein by reference in their entirety.

Figure 2:
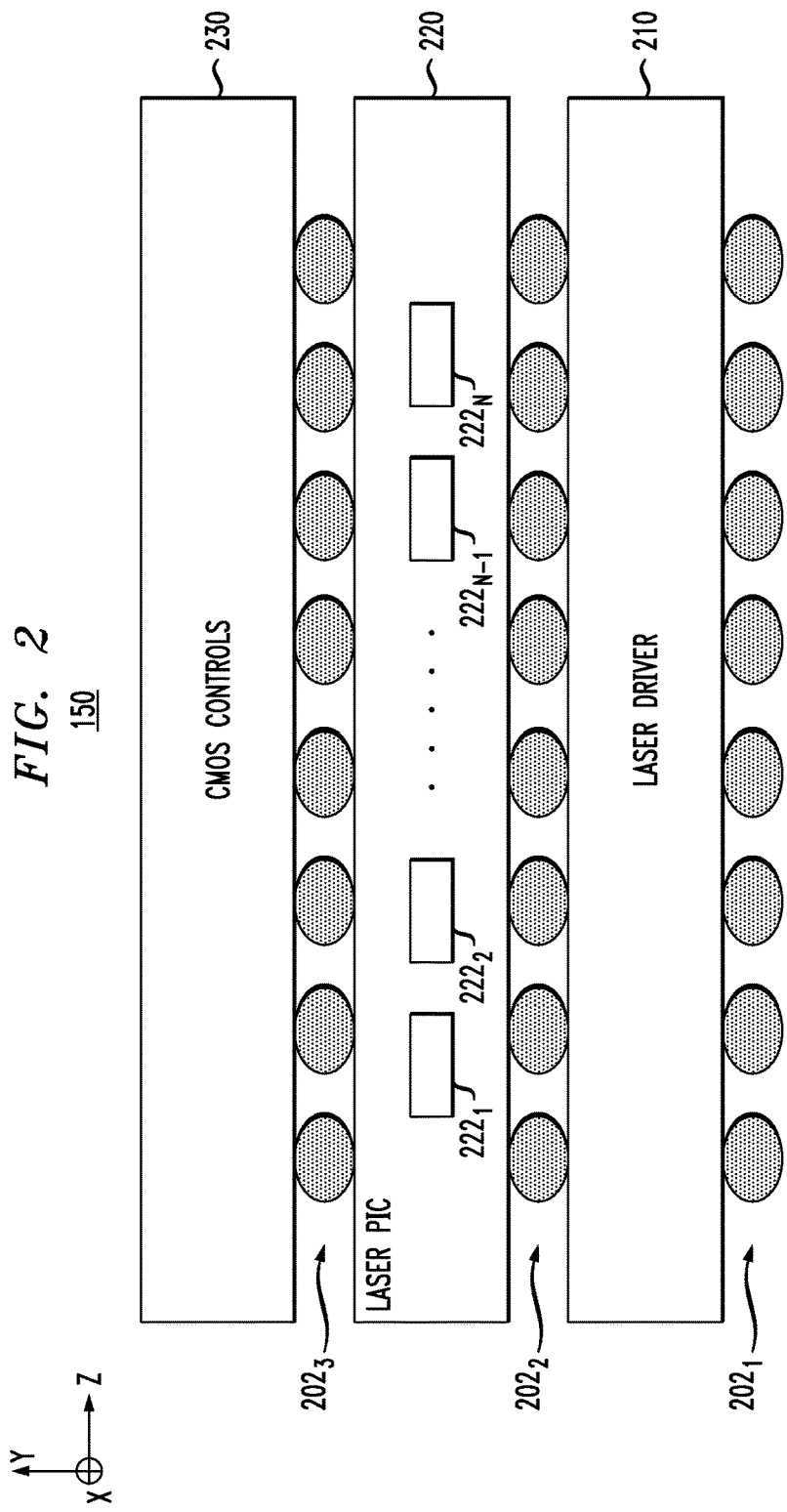
FIG. 2 shows a schematic side view of a laser module that can be used in the device of FIG. 1 according to an embodiment.

FIG. 2 shows a schematic side view of laser module 150 according to an embodiment. Laser module 150 is illustratively shown in FIG. 2 as being a hybrid circuit comprising three stacked integrated circuits (ICs) or dies 210-230. In an alternative embodiment, laser module 150 can be designed to have a different (from three) number of constituent ICs and/or dies.

As used herein, the term "hybrid circuit" refers to a multi-component circuit constructed of multiple monolithic ICs and possibly some discrete circuit components, all attached to each other to be mountable on and electrically connectable to a common base or carrier, such as substrate 102 (FIG. 1). A representative hybrid circuit may include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, dies, and discrete components can be formed, e.g., using patterned conducting (such as metal) layers, ball-grid arrays, solder bumps, wire bonds, etc. The individual ICs may include any combination of one or more respective substrates, one or more redistribution layers (RDLs), one or more interposers, one or more laminate plates, etc.

As used herein, the term "integrated circuit" should be construed to encompass both a non-packaged die and a packaged die.

In a typical IC-fabrication process, dies (chips) are produced in relatively large batches using wafers of silicon or other suitable material(s). Electrical and optical circuits can be gradually created on a wafer using a multi-step sequence of photolithographic and chemical processing steps. Each wafer is then cut ("diced") into many pieces (chips, dies), each containing a respective copy of the circuit that is being fabricated. Each individual die can be appropriately packaged prior to being incorporated into a hybrid circuit or be left non-packaged.

Dies intended for wire-bond packages are outfitted with small metal pads, typically located near the die edges. The individual dies are cut out of the wafer, and each die can be attached face up on its carrier, such as an interconnecting substrate, a redistribution layer, an interposer, a laminate plate, a wire board, or the like. Electrical wires can then be bonded to the metal pads on the face of the die to electrically connect the die to the carrier. These wires and the patterned conducting layers located in the body and/or on the surface of the carrier provide electrical connections between the die and the corresponding pins or terminals, e.g., located on the outside of the package. These pins/terminals can then be used to electrically connect the corresponding package to other ICs of the corresponding hybrid circuit and/or to external electrical circuitry, such as auxiliary circuits 160 (FIG. 1).

Processing a die intended for a flip-chip assembly is similar but has several additional and/or modified processing steps. For example, the small metal pads on the face of the die can be arranged in a two-dimensional area array instead of being in one or more linear edge arrays. This design feature can be realized, e.g., by adding dielectric and metal layers configured to appropriately route electrical connections from the functional semiconductor layer(s) of the die to the metal pads. A small dot (bump, ball) of solder can then be deposited on each metal pad. The wafer is then diced as customary. The resulting individual dies are fluxed and placed on the respective interconnecting substrates or mating dies face down (e.g., in a flipped orientation compared to that in a wire-bond package). The solder is then reflowed by being heated to above its melting temperature to form permanent electrical connections between the die and the substrate or mating die.

As used herein, the term "stack" refers to an orderly arrangement of packaged or non-packaged dies in which the main planes of the stacked dies are substantially parallel to each other. The main plain of the die is the plane parallel to a substantially planar surface thereof that has the largest sizes, e.g., length and width, among all exterior surfaces of the die. The exterior surfaces of the die that have one relatively large size, e.g., length, and one relatively small size, e.g., height, are typically referred to as the edges of the die. A stack can typically be mounted on a carrier, such as substrate 102 (FIG. 1), in an orientation in which the main plains of the stacked dies are parallel to the main plane of the carrier. In the view shown in FIG. 2, the main planes of ICs 210-230 are parallel to the XZ coordinate plane. The relative orientation of laser module 150, as shown in FIG. 2, and substrate 102 (FIG. 1) is indicated by the XYZ coordinate system, which is shown in both figures.

In an example embodiment, IC 220 can be a photonic integrated circuit (PIC) comprising a plurality of tunable semiconductor lasers $222_1$-$222_N$ configured to generate light in the C telecom band and direct the generated light to external circuits, e.g., by way of photonic bridges $120_2$ and $120_3$. IC 220 can be mechanically attached and electrically connected to ICs 210 and 230 using ball-grid arrays (BGAs) $202_2$ and $202_3$, respectively. IC 210 may include electrical circuits configured to generate one or more voltages and currents that can be used to appropriately drive the lasers of IC 220. IC 210 is connectable to substrate 102 using BGA $202_1$ and may also have electrical connections for connecting ICs 220 and 230 to that substrate. IC 230 may include electrical circuits that can be used to control the operation and/or configuration of IC 220, such as wavelength and power settings of the individual lasers, selective turn ON and OFF of the individual lasers, power-savings mode, etc.

In some embodiments, some or all of ICs 210-230 can themselves be hybrid circuits.

Figure 3:
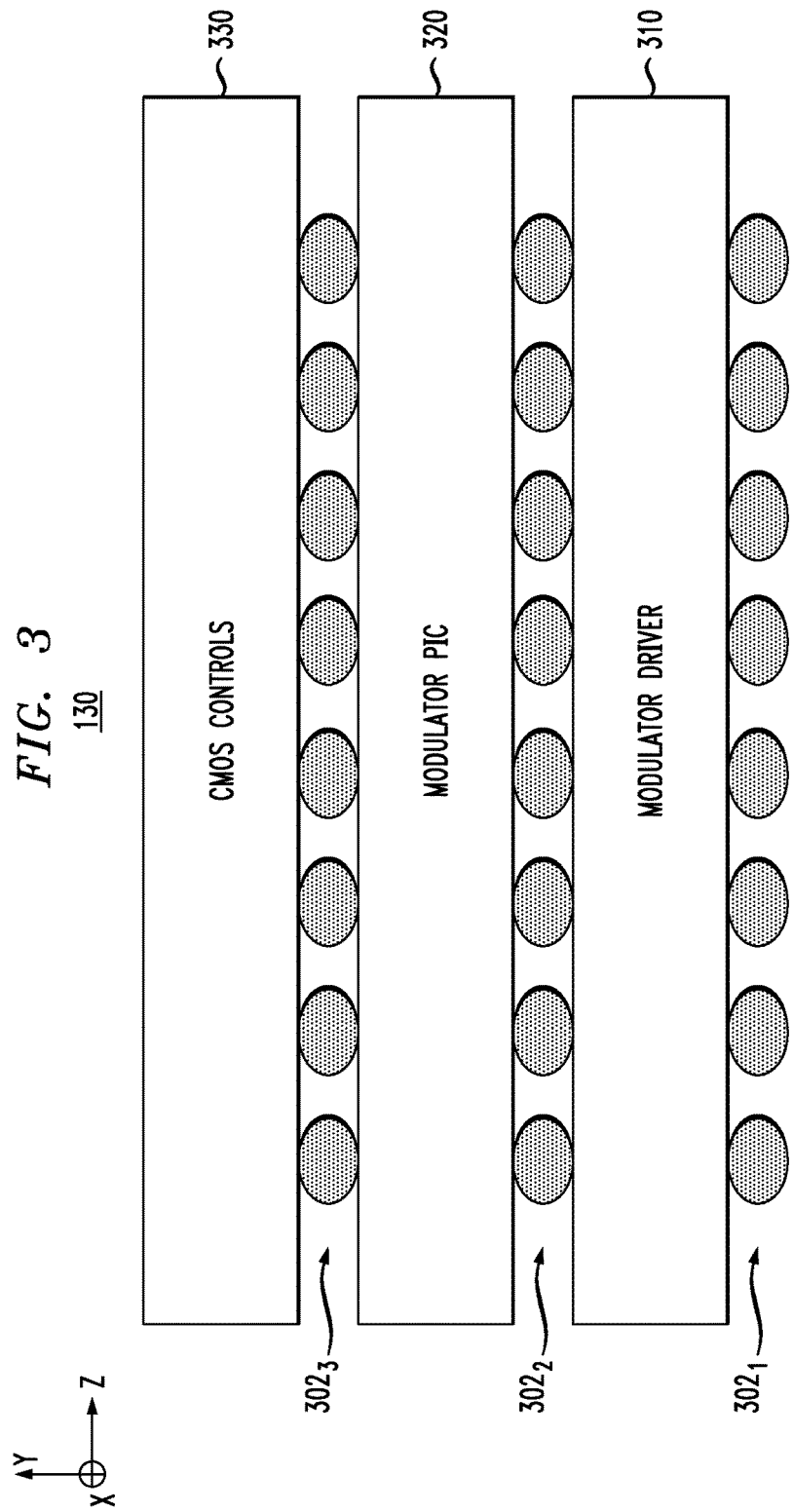
FIG. 3 shows a schematic side view of a modulator module that can be used in the device of FIG. 1 according to an embodiment.

FIG. 3 shows a schematic side view of modulator module 130 according to an embodiment. Modulator module 130 is illustratively shown in FIG. 3 as being a hybrid circuit comprising three stacked ICs or dies 310-330. In an alternative embodiment, modulator module 130 can be designed to have a different (from three) number of constituent ICs and/or dies. The relative orientation of modulator module 130, as shown in FIG. 3, and substrate 102 (FIG. 1) is indicated by the XYZ coordinate system, which is shown in both figures.

In an example embodiment, IC 320 can be a PIC comprising a plurality of optical modulators (not explicitly shown in FIG. 3, see FIGS. 5-6) configured to modulate light received by the PIC from an external light source, such as laser module 150 (see FIGS. 1-2), and direct the resulting modulated light to external circuits, e.g., by way of photonic bridge $120_1$. Example embodiments of an optical modulator, multiple copies of which can be used in PIC 320 are described in more detail below in reference to FIGS. 5-6.

PIC 320 can be mechanically attached and electrically connected to ICs 310 and 330 using BGAs $302_2$ and $302_3$, respectively. IC 310 may include electrical circuits configured to generate one or more voltages and currents that can be used to appropriately drive the optical modulators of PIC 320. IC 310 is connectable to substrate 102 using BGA $302_1$ and may also have electrical connections for connecting PIC 320 and IC 330 to that substrate. IC 330 may include electrical circuits that can be used to control the operation and/or configuration of PIC 320 and IC 310, such as selective turn ON and OFF of the individual drivers, configurations of optical switches (if any), phase-shifter settings for different modulation formats, etc.

Figure 4:
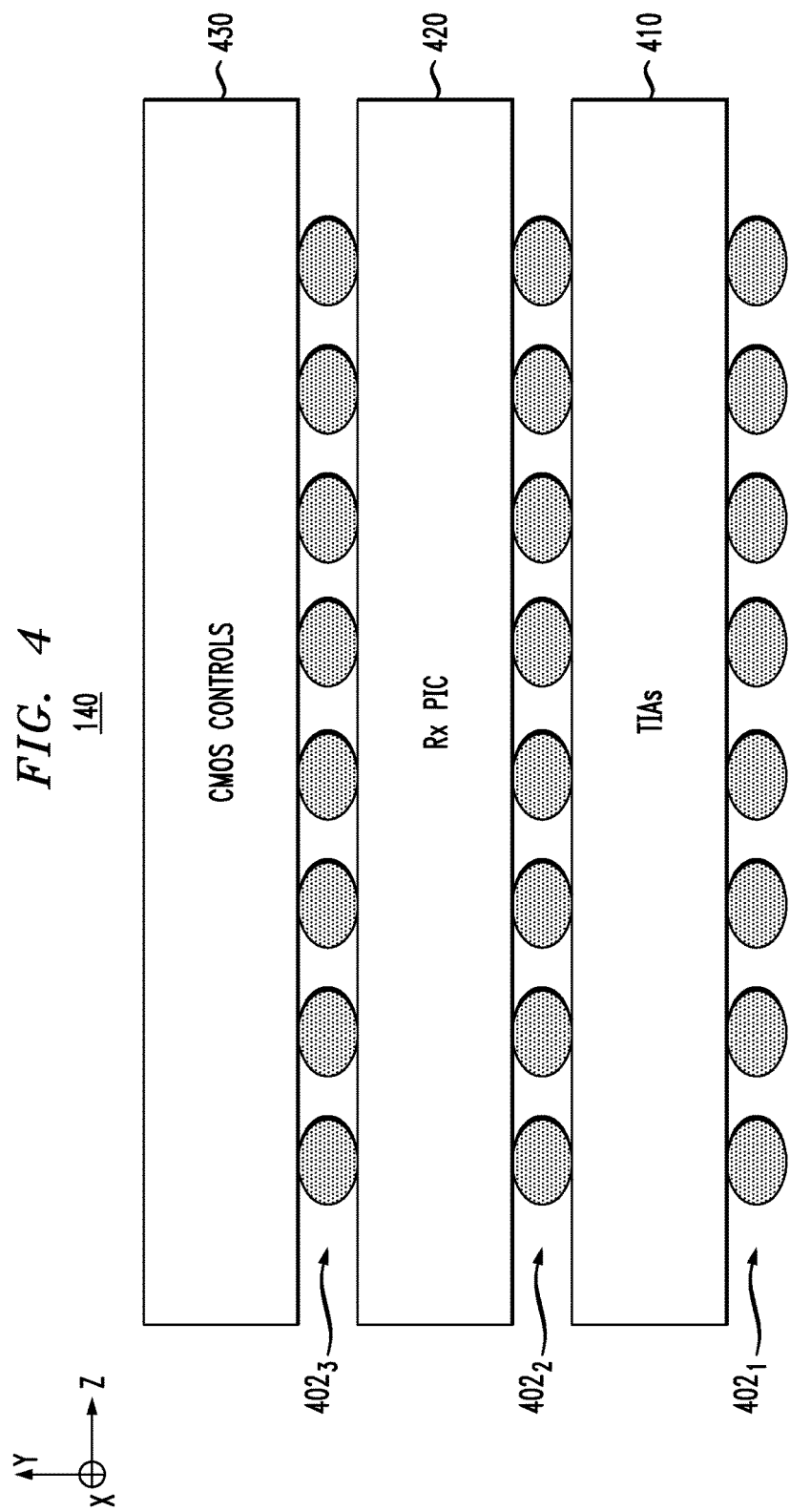
FIG. 4 shows a schematic side view of an optical-to-electrical converter that can be used in the device of FIG. 1 according to an embodiment.

FIG. 4 shows a schematic side view of O/E module 140 according to an embodiment. O/E module 140 is illustratively shown in FIG. 4 as being a hybrid circuit comprising three stacked ICs or dies 410-430. In an alternative embodiment, O/E module 140 can be designed to have a different (from three) number of constituent ICs and/or dies. The relative orientation of O/E module 140, as shown in FIG. 4, and substrate 102 (FIG. 1) is indicated by the XYZ coordinate system, which is shown in both figures.

In an example embodiment, IC 420 can be a PIC comprising a plurality of optical receivers (not explicitly shown in FIG. 4, see FIG. 7) configured to detect light received by the PIC from an external light source, e.g., by way of photonic bridge $120_4$, convert the received light into electrical signals, and optionally direct these electrical signals to external circuits, such as ICs 410/430 and/or one or more auxiliary circuits 160 (FIG. 1), for further processing therein. Example embodiments of an optical receiver, multiple copies of which can be used in PIC 420 are described in more detail below in reference to FIG. 7.

PIC 420 can be mechanically attached and electrically connected to ICs 410 and 430 using BGAs $402_2$ and $402_3$, respectively. IC 410 may include electrical circuits (e.g., transimpedance amplifiers, TIAs) configured to amplify the electrical signals generated by PIC 420 in response to the received light. IC 410 is connectable to substrate 102 using BGA $402_1$ and may also have electrical connections for connecting PIC 420 and IC 430 to that substrate. IC 430 may include electrical circuits that can be used to control the operation and/or configuration of the individual optical receivers of PIC 420.

Figure 5:
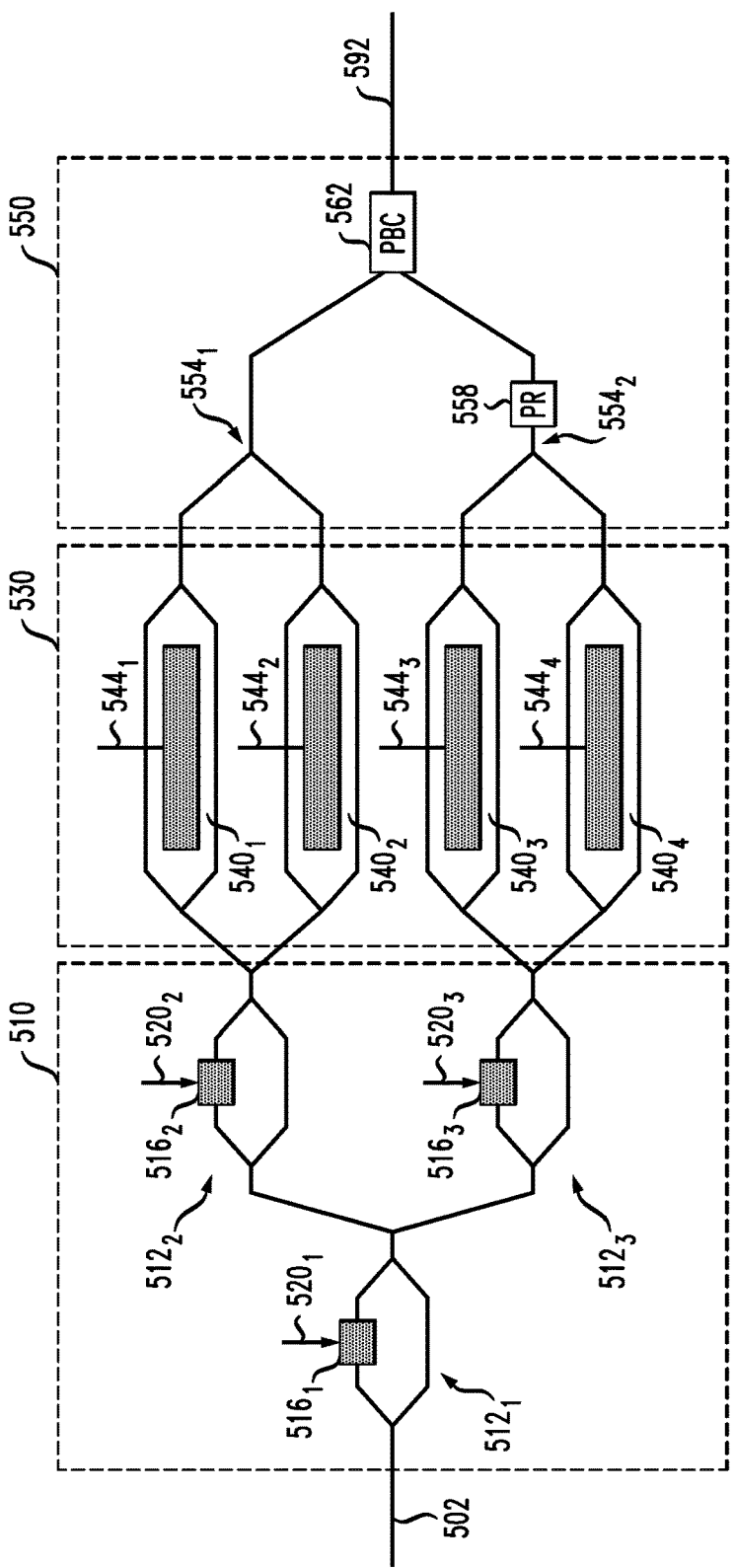
FIG. 5 shows a block diagram of an optical modulator that can be used in the modulator module of FIG. 3 according to an embodiment.

FIG. 5 shows a block diagram of an optical modulator 500 that can be used to implement PIC 320 (FIG. 3) according to an embodiment. As already indicated above, PIC 320 can be designed to have multiple instances (nominal physical copies) of modulator 500. In an example embodiment, PIC 320 may have ten or more optical modulators 500.

Optical modulator 500 comprises a configurable optical splitter 510, a modulator section 530, and an optical combiner 550. Optical splitter 510 is configured to receive light through an input waveguide 502 that can be connected, e.g., to one of the lasers of laser module 150, by way of photonic bridge $120_2$ (see FIGS. 1 and 2). Modulator section 530 operates to modulate the light received through optical splitter 510. Optical combiner 550 is configured to output the modulated light generated by modulator section 530 through an output waveguide 592 that can be connected by way of photonic bridge $120_1$ (FIG. 1), e.g., to one of waveguides 112.

Optical splitter 510 comprises Mach-Zehnder splitters (or switches) $512_1$-$512_3$, each having a respective tunable phase shifter 516. The amount of phase shift imposed by each phase shifter 516 is determined by a respective bias voltage 520 that can be generated, e.g., by IC 310 in response to a corresponding control signal generated by IC 330 (see FIG. 3). Depending on the combination of bias voltages $520_1$-$520_3$, optical splitter 510 can direct different respective fractions of the received light to different ones of Mach-Zehnder modulators (MZMs) $540_1$-$540_4$ of modulator section 530.

For example, in one possible configuration of Mach-Zehnder splitters $512_1$-$512_3$, optical splitter 510 can direct equal fractions of the received light to MZMs $540_1$-$540_4$. In another possible configuration of Mach-Zehnder splitters $512_1$-$512_3$, optical splitter 510 can direct equal fractions of the received light to MZMs $540_1$ and $540_2$ while directing substantially no light to MZMs $540_3$ and $540_4$. In yet another possible configuration of Mach-Zehnder splitters $512_1$-$512_3$, optical splitter 510 can direct equal fractions of the received light to MZMs $540_3$ and $540_4$ while directing substantially no light to MZMs $540_1$ and $540_2$. In yet another possible configuration of Mach-Zehnder splitters $512_1$-$512_3$, optical splitter 510 can direct substantially all of the received light to a selected one of MZMs $540_1$-$540_4$ while directing substantially no light to the other three MZMs. A person of ordinary skill in the art will understand that other configurations of optical splitter 510 are also possible.

In an example embodiment, each of MZMs $540_1$-$540_4$ can be a conventional optical MZM that modulates light in response to a respective radio-frequency (RF) drive signal 544. Each of RF drive signal $544_1$-$544_4$ can be generated, e.g., by IC 310 in response to a corresponding control signal generated by IC 330 (see FIG. 3).

Optical combiner 550 comprises power combiners $554_1$ and $554_2$, a polarization rotator (PR) 558, and a polarization beam combiner (PBC) 562. Power combiner $554_1$ operates to combine light received from MZMs $540_1$ and $540_2$ and direct the resulting combined optical beam to PBC 562. Power combiner $554_2$ similarly operates to combine light received from MZMs $540_3$ and $540_4$ and direct the resulting combined optical beam to polarization rotator 558. Polarization rotator 558 operates to rotate the polarization of the received optical beam by 90 degrees. In a typical configuration, the modulated light received from modulator section 530 has a TE (transverse electric) polarization. In this configuration, polarization rotator 558 operates to convert the TE polarization into a TM (transverse magnetic) polarization. PBC 562 then operates to combine the TE- and TM-polarized beams and apply the resulting polarization-multiplexed optical beam to output waveguide 592.

Depending on the applied bias voltages $520_1$-$520_3$ and RF drive signals $544_1$-$544_4$, optical modulator 500 can operate as: (i) an IQ modulator configured to generate a polarization-division-multiplexed (PDM) communication signal for a respective WDM channel; (ii) an amplitude (e.g., ON/OFF keying, OOK, or pulse-amplitude) modulator configured to generate a PDM communication signal for a respective WDM channel; (iii) an IQ modulator configured to generate a single-polarization (e.g., TE or TM) communication signal for a respective WDM channel; or (iv) an amplitude modulator configured to generate a single-polarization (e.g., TE or TM) communication signal for a respective WDM channel.

As used herein, the term "amplitude modulator" refers to a modulator that imposes substantially only amplitude modulation, e.g., in accordance with a selected pulse-amplitude-modulation (PAM) format. An amplitude modulator should be contrasted with an IQ modulator, which imposes both phase and amplitude modulation, e.g., in accordance with a quadrature-amplitude-modulation (QAM) format. An amplitude modulator should also be contrasted with a phase modulator, which imposes substantially only phase modulation, e.g., in accordance with a phase-shift-keying (PSK) format.

Figure 6:
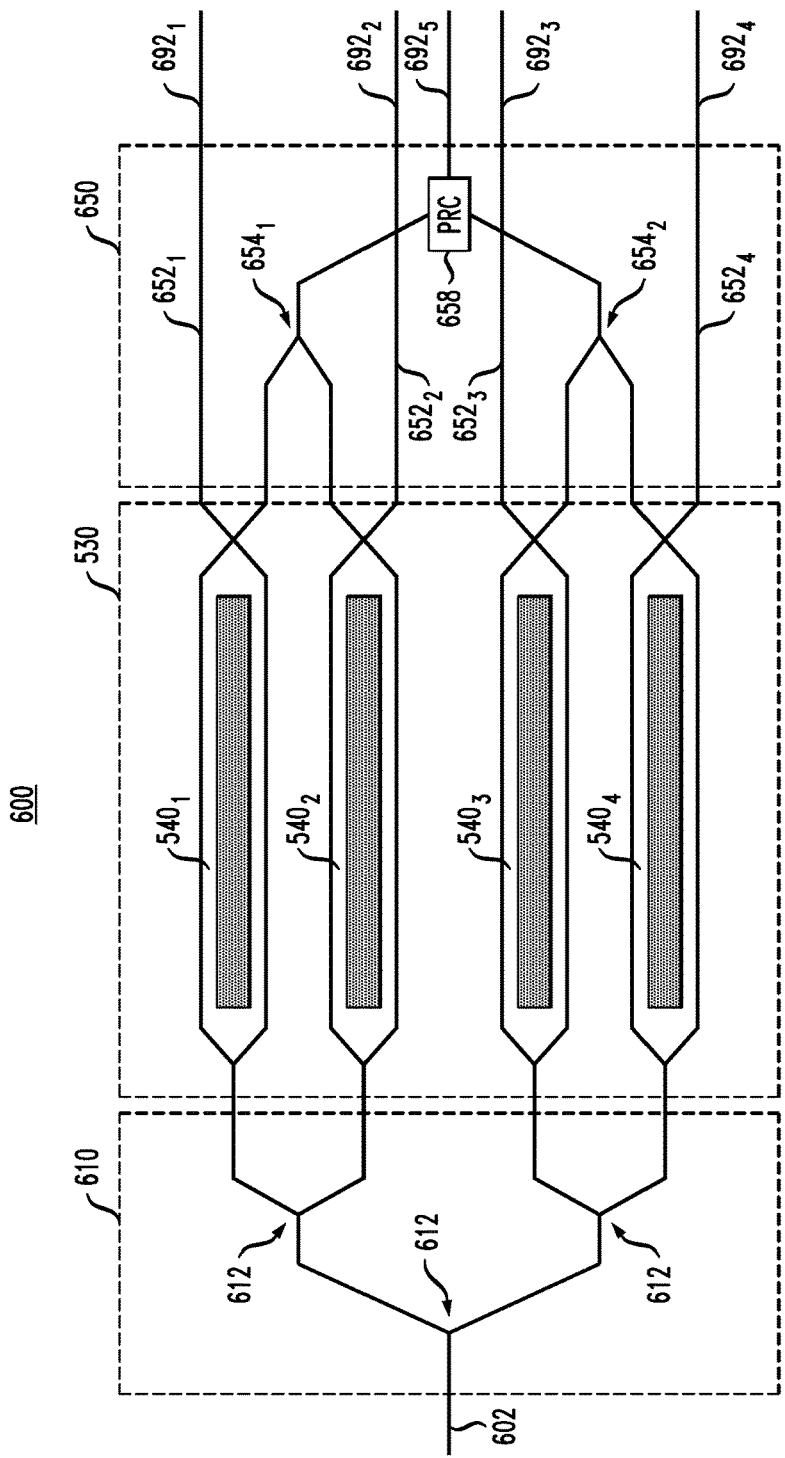
FIG. 6 shows a block diagram of an optical modulator that can be used in the modulator module of FIG. 3 according to an alternative embodiment.

FIG. 6 shows a block diagram of an optical modulator 600 that can be used to implement PIC 320 (FIG. 3) according to an alternative embodiment. In an example embodiment, PIC 320 may have ten or more optical modulators 600.

Optical modulator 600 comprises a power splitter 610, modulator section 530, and an optical interface 650. Optical splitter 610 is configured to receive light through an input waveguide 602 that can be connected, e.g., to one of the lasers of laser module 150, by way of photonic bridge $120_2$ (see FIGS. 1 and 2). Optical interface 650 is configured to output the modulated light generated by modulator section 530 through output waveguides $692_1$-$692_5$ that can be connected by way of photonic bridge $120_1$ (FIG. 1), e.g., to the corresponding waveguides 112.

Power splitter 610 is a fixed 1×4 power splitter configured to direct equal fractions of the received light to MZMs $540_1$-$540_4$ of modulator section 530. In an example embodiment, power splitter 610 can be implemented using three conventional 3-dB power splitters 612 connected as indicated in FIG. 6. A person of ordinary skill in the art will understand that other implementations of power splitter 610 are also possible.

Optical interface 650 comprises feed-through waveguides $652_1$-$652_4$ that directly connect MZMs $540_1$-$540_4$ of modulator section 530 to output waveguides $692_1$-$692_4$, respectively. Optical interface 650 further comprises an optical combiner that is functionally analogous to optical combiner 550 (see FIG. 5). This power combiner feeds the modulated light generated by MZMs $540_1$-$540_4$ into output waveguide $692_5$ by way of power combiners $654_1$ and $654_2$ and a polarization-rotating combiner (PRC) 658.

Power combiner $654_1$ operates to combine light received from MZMs $540_1$ and $540_2$ and direct the resulting combined optical beam to PRC 658. Power combiner $654_2$ similarly operates to combine light received from MZMs $540_3$ and $540_4$ and direct the resulting combined optical beam to PRC 658. PRC 658 operates to: (i) rotate by 90 degrees the polarization of the TE-polarized optical beam received from power combiner $654_2$; (ii) combine the resulting TM-polarized beam with the TE-polarized optical beam received from power combiner $654_1$; and (iii) apply the resulting polarization-multiplexed optical beam to output waveguide $692_5$. An example PRC that can be used to implement PRC 658 is disclosed, e.g., by Po Dong in U.S. patent application Ser. No. 15/475,805, which is incorporated herein by reference in its entirety.

Depending on the intended application, optical modulator 600 can be configured to operate as: (i) an IQ modulator configured to generate a PDM communication signal for a respective WDM channel; (ii) an amplitude modulator configured to generate a PDM communication signal for a respective WDM channel; or (iii) an amplitude modulator configured to generate a single-polarization (e.g., TE or TM) communication signal for a respective WDM channel. The configuration choice for optical modulator 600 can be effected, e.g., by (i) appropriately configuring and driving modulator section 530 and (ii) collecting the resulting modulated light from the selected one or more output waveguides $692_1$-$692_5$.

Figure 7:
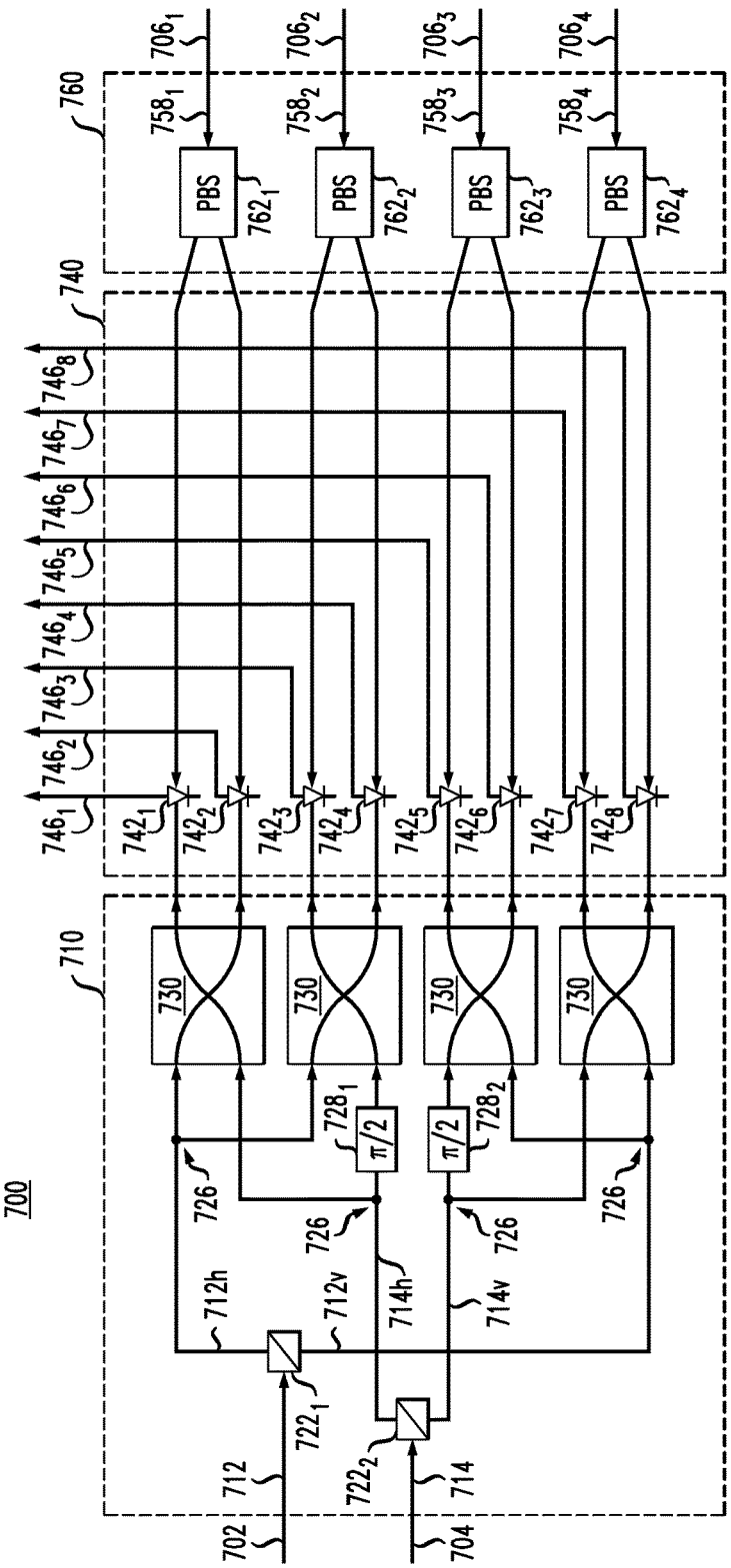
FIG. 7 shows a block diagram of an optical receiver that can be used in the optical-to-electrical converter of FIG. 4 according to an embodiment.

FIG. 7 shows a block diagram of an optical receiver 700 that can be used to implement PIC 420 (FIG. 4) according to an embodiment. As already indicated above, PIC 420 can be designed to have multiple instances (nominal physical copies) of optical receiver 700. In an example embodiment, PIC 420 may have ten or more optical receivers 700.

Optical receiver 700 comprises optical front ends 710 and 760 and a photodetector section 740. In some embodiments, optical front end 710 may be absent. In some other embodiments, optical front end 760 may be absent.

Optical front end 710 is configured to receive light through input waveguides 702 and 704. Input waveguide 702 can be connected by way of photonic bridge $120_4$ (FIG. 1), e.g., to one of waveguides 114. Input waveguide 704 can be connected by way of photonic bridge $120_3$ (FIG. 1), e.g., to one of the lasers of laser module 150.

In operation, optical front end 710 can implement a polarization-diversity intradyne-detection scheme, wherein a PDM communication signal 712 that is being detected is received through input waveguide 702, and the corresponding local-oscillator (LO) signal 714 is received through input waveguide 704. Polarization beam splitters $722_1$ and $722_2$ decompose signals 712 and 714, respectively, into two respective orthogonally polarized components, illustratively vertically (v-) polarized components 712v and 714v and horizontally (h-) polarized components 712h and 714h. Each of polarization components 712v, 714v, 712h, and 714h is split into two (attenuated) copies using a respective 3-dB power splitter 726. A relative phase shift of about 90 degrees ($\pi/2$ radian) is then applied to one copy of component 714h and one copy of component 714v using phase shifters $728_1$ and $728_2$, respectively. The various copies of signals 712v, 714v, 712h, and 714h are optically mixed with each other using four optical signal mixers 730, and the eight mixed optical signals produced by the optical signal mixers are directed to photodetector section 740 for being detected therein by eight photo-detectors (e.g., photodiodes) $742_1$-$742_8$.

Optical front end 760 comprises polarization beam splitters (PBSs) $762_1$-$762_4$ and is configured to receive light through input waveguides $706_1$-$706_4$. Each of input waveguides $706_1$-$706_4$ can be connected, e.g., to a respective one of waveguides 114, by way of photonic bridge $120_4$ (FIG. 1). Each of polarization beam splitters $762_1$-$762_4$ operates to decompose a respective optical signal 758 received through the respective input waveguide 706 into two respective orthogonally polarized components and then direct each of the components to photodetector section 740 for being detected therein by a respective one of photodetectors $742_1$-$742_8$.

In some embodiments, some or all of polarization beam splitters 722 and/or 762 can be replaced by polarization-rotating splitters. An example polarization-rotating splitter that can be used for this purpose is disclosed, e.g., by Po Dong in the above-cited U.S. patent application Ser. No. 15/475,805.

In some embodiments, some of polarization beam splitters 722 and/or 762 can be replaced by 3-dB power splitters.

In response to the light received through input waveguides 702/704 or $706_1$-$706_4$, photodetectors $742_1$-$742_8$ generate electrical signals $746_1$-$746_8$, respectively. In an example configuration of optical receiver 700, electrical signals $746_1$-$746_8$ can be directed to IC 410 (FIG. 4), where each of these signals can be amplified using a respective TIA. Depending on the intended application of optical receiver 700, the amplified electrical signals $746_1$-$746_8$ can optionally be combined in IC 410 in several different ways.

For example, in some embodiments, electrical signals $746_1$-$746_8$ can be arranged in four pairs, such as $746_1/746_2$, $746_3/746_4$, $746_5/746_6$, and $746_7/746_8$, and then amplified in a differential or additive manner. In some embodiments, IC 410 can be configurable in terms of how this IC amplifies electrical signals $746_1$-$746_8$, e.g., individually, differentially, or additively. IC 410 can also be configurable in terms of which sets (e.g., pairs) of electrical signals $746_1$-$746_8$ are being combined therein.

Depending on the intended application, optical receiver 700 can operate as: (i) a coherent receiver configured for homodyne or intradyne detection of a PDM communication signal corresponding to a respective WDM channel; (ii) a coherent receiver configured for polarization-insensitive homodyne or intradyne detection of a communication signal corresponding to a respective WDM channel; (iii) a set of up to four direct-detection receivers, each configured for detection of a PDM communication signal corresponding to a respective WDM channel; and (iv) a set of up to four direct-detection receivers, each configured for polarization-insensitive detection of a communication signal corresponding to a respective WDM channel. The configuration choice for optical receiver 700 can be effected, e.g., by (i) coupling one or more optical communication signals into a subset of input waveguides appropriately selected from input waveguides 702 and $706_1$-$706_4$; (ii) if appropriate, coupling a proper LO signal into input waveguide 704; and (iii) properly configuring IC 410 so that electrical signals $746_1$-$746_8$, or a subset thereof, are handled therein in accordance with the detection scheme that is being implemented.

As used herein, the term "direct detection" refers to a receiver configuration in which a corresponding photodetector is configured to generate an electrical signal that is proportional to the optical power (e.g., electric field squared) of the received communication signal. Direct detection should be contrasted with coherent detection in which a corresponding photodetector is configured to generate an electrical signal that is proportional to the electric field of the received communication signal. The latter is typically accomplished, e.g., by optically mixing the received communication signal with a local-oscillator signal and then applying a resulting mixed optical signal to the photodetector. Typically, direct detection does not use or rely on a local-oscillator signal.

According to an example embodiment disclosed above in reference to FIGS. 1-7, provided is an apparatus (e.g., 100, FIG. 1) comprising: a substantially planar substrate (e.g., 102, FIG. 1); a first optoelectronic module (e.g., 150, FIG. 1) supported on the substantially planar substrate; and a second optoelectronic module (e.g., 130 or 140, FIG. 1) supported on the substantially planar substrate; wherein each of the first and second optoelectronic modules comprises a respective stack of two or more electrically interconnected integrated circuits (e.g., 210-230, FIG. 2; 310-330, FIG. 3; 410-430, FIG. 4), each of the respective stacks including a respective photonic integrated circuit (e.g., 220, FIG. 2; 320, FIG. 3; 420, FIG. 4); and wherein the photonic integrated circuit of the second optoelectronic module is optically coupled (e.g., by way of 120, FIG. 1) to receive light generated by the photonic integrated circuit of the first optoelectronic module.

In some embodiments of the above apparatus, the photonic integrated circuit of the first optoelectronic module comprises a plurality of tunable semiconductor lasers (e.g., $222_1$-$222_N$, FIG. 2), at least some of which are optically coupled to transmit light to the photonic integrated circuit of the second optoelectronic module.

In some embodiments of any of the above apparatus, the photonic integrated circuit of the first optoelectronic module (e.g., combined 130/150, FIG. 1) further comprises a plurality of optical modulators (e.g., 500, FIG. 5; 600, FIG. 6), at least some of which are optically coupled to modulate the light generated by at least some of the plurality of tunable semiconductor lasers.

In some embodiments of any of the above apparatus, the photonic integrated circuit of the first optoelectronic module (e.g., combined 130/140, FIG. 1) further comprises a plurality of optical receivers (e.g., 700, FIG. 7), at least some of which are configurable to use the light generated by at least some of the plurality of tunable semiconductor lasers as a local-oscillator signal.

In some embodiments of any of the above apparatus, the photonic integrated circuit of the second optoelectronic module comprises a plurality of optical modulators (e.g., 500, FIG. 5; 600, FIG. 6), at least some of which are optically coupled to modulate the light generated by the photonic integrated circuit of the first optoelectronic module.

In some embodiments of any of the above apparatus, an optical modulator (e.g., 500, FIG. 5; 600, FIG. 6) of the second optoelectronic module is configurable to operate as one of an IQ modulator and an amplitude modulator.

In some embodiments of any of the above apparatus, the optical modulator (e.g., 500, FIG. 5) is configurable to operate as one of an IQ modulator and an amplitude modulator in response to one or more control signals (e.g., 520, FIG. 5) generated by another integrated circuit (e.g., 310/330, FIG. 3) in the respective stack of the second optoelectronic module.

In some embodiments of any of the above apparatus, the optical modulator (e.g., 600, FIG. 6) is configurable to operate as an optical device selected from a device set consisting of: an IQ modulator; an amplitude modulator; two amplitude modulators; three amplitude modulators; and four amplitude modulators.

In some embodiments of any of the above apparatus, the optical modulator is further configurable to generate a PDM signal, each polarization of which is modulated with data independent of another polarization.

In some embodiments of any of the above apparatus, the photonic integrated circuit of the second optoelectronic module comprises a plurality of optical receivers (e.g., 700, FIG. 7), at least some of which are configurable to use the light generated by the photonic integrated circuit of the first optoelectronic module as a local-oscillator signal.

In some embodiments of any of the above apparatus, an optical receiver (e.g., 700, FIG. 7) of the second optoelectronic module is configurable to operate as an optical device selected from a device set consisting of: a coherent optical receiver configured for detection of a communication signal (e.g., 712, FIG. 7) using the local-oscillator signal (e.g., 714, FIG. 7); an optical receiver configured for direct detection of a communication signal (e.g., 758, FIG. 7); two optical receivers, each configured for direct detection of a respective communication signal (e.g., $758_1$ and $758_2$, FIG. 7); three optical receivers, each configured for direct detection of a respective communication signal (e.g., $758_1$-$758_3$, FIG. 7); and four optical receivers, each configured for direct detection of a respective communication signal (e.g., $758_1$-$758_4$, FIG. 7).

In some embodiments of any of the above apparatus, the at least some of the optical receivers are further configurable to operate as a dual-polarization receiver configured to detect a polarization-division-multiplexed signal, each polarization of which is modulated with data independent of another polarization.

In some embodiments of any of the above apparatus, the photonic integrated circuit of the first optoelectronic module is configured to generate the light in response to one or more electrical signals generated by another integrated circuit (e.g., 210/230, FIG. 2) in the respective stack of the first optoelectronic module.

In some embodiments of any of the above apparatus, the photonic integrated circuit of the second optoelectronic module is configured to modulate the light generated by the photonic integrated circuit of the first optoelectronic module in response to one or more electrical signals generated by another integrated circuit (e.g., 310/330, FIG. 3) in the respective stack of the second optoelectronic module.

In some embodiments of any of the above apparatus, the apparatus further comprises a third optoelectronic module (e.g., the other of 130 or 140, FIG. 1) supported on the substantially planar substrate; wherein the third optoelectronic module comprises a respective stack of two or more electrically interconnected integrated circuits (e.g., 310-330, FIG. 3, or 410-430, FIG. 4) that includes a respective photonic integrated circuit (e.g., 320, FIG. 3, or 420, FIG. 4); and wherein the photonic integrated circuit of the third optoelectronic module is optically coupled (e.g., by way of 120, FIG. 1) to receive light generated by the photonic integrated circuit of the first optoelectronic module.

In some embodiments of any of the above apparatus, the photonic integrated circuit of the first optoelectronic module comprises a plurality of tunable semiconductor lasers (e.g., $222_1$-$222_N$, FIG. 2), at least some of which are optically coupled to transmit light to the photonic integrated circuit of the second optoelectronic module.

In some embodiments of any of the above apparatus, the photonic integrated circuit of the second optoelectronic module comprises a plurality of optical modulators (e.g., 530, FIGS. 5-6), at least some of which are optically coupled to modulate the light generated by the photonic integrated circuit of the first optoelectronic module.

In some embodiments of any of the above apparatus, the photonic integrated circuit of the third optoelectronic module comprises a plurality of optical receivers (e.g., 700, FIG. 7), at least some of which are configurable to use the light generated by the photonic integrated circuit of the first optoelectronic module as a local-oscillator signal.

In some embodiments of any of the above apparatus, the apparatus further comprises an optical coupler (e.g., 110, FIG. 1) supported on the substantially planar substrate; wherein the plurality of optical modulators are optically coupled to transmit light through the optical coupler; and wherein the plurality of optical receivers are optically coupled to receive light through the optical coupler.

In some embodiments of any of the above apparatus, the apparatus further comprises an optical coupler (e.g., 120, FIG. 1) connected to optically couple the photonic integrated circuit of the first optoelectronic module and the photonic integrated circuit of the second optoelectronic module, the optical coupler being a passive optical device selected from an optical-device set consisting of: a monolithic optical module; a micro-optic device; a photonic integrated circuit; a planar lightwave circuit; and a 3-dimensional waveguide.

According to another example embodiment disclosed above in reference to FIGS. 1-7, provided is a method of making a modular optical device (e.g., 100, FIG. 1), the method comprising the steps of: mounting a first optoelectronic module (e.g., 150, FIG. 1) on a substantially planar substrate (e.g., 102, FIG. 1); and mounting a second optoelectronic module (e.g., 130 or 140, FIG. 1) on the substantially planar substrate; wherein each of the first and second optoelectronic modules comprises a respective stack of two or more electrically interconnected integrated circuits (e.g., 210-230, FIG. 2; 310-330, FIG. 3; 410-430, FIG. 4), each of the respective stacks including a respective photonic integrated circuit (e.g., 220, FIG. 2; 320, FIG. 3; 420, FIG. 4); and wherein the method further comprises optically coupling (e.g., by way of 120, FIG. 1) the photonic integrated circuit of the second optoelectronic module to receive light generated by the photonic integrated circuit of the first optoelectronic module.

In some embodiments of the above method, the method further comprises mounting a third optoelectronic module (e.g., the other of 130 or 140, FIG. 1) supported on the substantially planar substrate; wherein the third optoelectronic module comprises a respective stack of two or more electrically interconnected integrated circuits (e.g., 310-330, FIG. 3, or 410-430, FIG. 4) that includes a respective photonic integrated circuit (e.g., 320, FIG. 3, or 420, FIG. 4); and wherein the method further comprises optically coupling (e.g., by way of another 120, FIG. 1) the photonic integrated circuit of the third optoelectronic module to receive light generated by the photonic integrated circuit of the first optoelectronic module.

In some embodiments of any of the above methods, the photonic integrated circuit of the first optoelectronic module comprises a plurality of tunable semiconductor lasers (e.g., $222_1$-$222_N$, FIG. 2), at least some of which are optically coupled to transmit light to the photonic integrated circuit of the second optoelectronic module.

In some embodiments of any of the above methods, the photonic integrated circuit of the second optoelectronic module comprises a plurality of optical modulators (e.g., 530, FIGS. 5-6), at least some of which are optically coupled to modulate the light generated by the photonic integrated circuit of the first optoelectronic module.

In some embodiments of any of the above methods, the photonic integrated circuit of the third optoelectronic module comprises a plurality of optical receivers (e.g., 700, FIG. 7), at least some of which are configurable to use the light generated by the photonic integrated circuit of the first optoelectronic module as a local-oscillator signal.

In some embodiments of the above method, the method further comprises optically connecting (e.g., using 602, $692_1$-$692_5$, FIG. 6) an optical modulator of the second optoelectronic module (e.g., 600, FIG. 6) to operate as an optical device selected from a device set consisting of: an IQ modulator; an amplitude modulator; two amplitude modulators; three amplitude modulators; and four amplitude modulators.

In some embodiments of the above method, the method further comprises optically connecting (e.g., using 702, 704, $706_1$-$706_4$, FIG. 6) an optical receiver (e.g., 700, FIG. 7) of the second optoelectronic module to operate as an optical device selected from a device set consisting of: a coherent optical receiver configured for detection of a communication signal (e.g., 712, FIG. 7) using the local-oscillator signal (e.g., 714, FIG. 7); an optical receiver configured for direct detection of a communication signal (e.g., 758, FIG. 7); two optical receivers, each configured for direct detection of a respective communication signal (e.g., $758_1$ and $758_2$, FIG. 7); three optical receivers, each configured for direct detection of a respective communication signal (e.g., $758_1$-$758_3$, FIG. 7); and four optical receivers, each configured for direct detection of a respective communication signal (e.g., $758_1$-$758_4$, FIG. 7).

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
   a substantially planar substrate;
   a first optoelectronic module supported on the substantially planar substrate;
   a second optoelectronic module supported on the substantially planar substrate; and
   a third optoelectronic module supported on the substantially planar substrate;
   wherein each of the first and second optoelectronic modules comprises a respective stack of two or more electrically interconnected integrated circuits, each of the respective stacks including a respective photonic integrated circuit; and
   wherein the third optoelectronic module comprises a respective stack of two or more electrically interconnected integrated circuits that includes a respective photonic integrated circuit;
   wherein the photonic integrated circuit of the second optoelectronic module is optically coupled to receive light generated by the photonic integrated circuit of the first optoelectronic module; and
   wherein the photonic integrated circuit of the third optoelectronic module is optically coupled to receive light generated by the photonic integrated circuit of the first optoelectronic module.

2. The apparatus of claim 1, wherein the photonic integrated circuit of the first optoelectronic module comprises a plurality of tunable semiconductor lasers, at least some of which are optically coupled to transmit light to the photonic integrated circuit of the second optoelectronic module.

3. The apparatus of claim 2, wherein the photonic integrated circuit of the second optoelectronic module comprises a plurality of optical modulators, at least some of which are optically coupled to modulate the light generated by at least some of the plurality of tunable semiconductor lasers.

4. The apparatus of claim 3, wherein the photonic integrated circuit of the third optoelectronic module comprises a plurality of optical receivers, at least some of which are configurable to use the light generated by at least some of the plurality of tunable semiconductor lasers as local-oscillator signals.

5. The apparatus of claim 1, wherein the photonic integrated circuit of the second optoelectronic module comprises a plurality of optical modulators, at least some of which are optically coupled to modulate the light generated by the photonic integrated circuit of the first optoelectronic module.

6. The apparatus of claim 5, wherein an optical modulator of the second optoelectronic module is configurable to operate as one of an IQ modulator and an amplitude modulator.

7. The apparatus of claim 6, wherein the optical modulator is configurable to operate as one of an IQ modulator and an amplitude modulator in response to one or more control signals generated by another integrated circuit in the respective stack of the second optoelectronic module.

8. The apparatus of claim 6, wherein the optical modulator is configurable to operate as an optical device selected from a device set consisting of:
   an IQ modulator;
   an amplitude modulator;
   two amplitude modulators;
   three amplitude modulators; and
   four amplitude modulators.

9. The apparatus of claim 6, wherein the optical modulator is further configurable to generate a polarization-division-multiplexed signal, each polarization of which is modulated with data independent of another polarization.

10. The apparatus of claim 1, wherein the photonic integrated circuit of the second optoelectronic module comprises a plurality of optical receivers, at least some of which are configurable to use the light generated by the photonic integrated circuit of the first optoelectronic module as local-oscillator signals.

11. The apparatus of claim 10, wherein an optical receiver of the second optoelectronic module is configurable to operate as an optical device selected from a device set consisting of:
    a coherent optical receiver configured for detection of a communication signal using the local-oscillator signal;
    an optical receiver configured for direct detection of a communication signal;
    two optical receivers, each configured for direct detection of a respective communication signal;
    three optical receivers, each configured for direct detection of a respective communication signal; and
    four optical receivers, each configured for direct detection of a respective communication signal.

12. The apparatus of claim 10, wherein the at least some of the optical receivers are further configurable to operate as a dual-polarization receiver configured to detect a polarization-division-multiplexed signal, each polarization of which is modulated with data independent of another polarization.

13. The apparatus of claim 1, wherein the photonic integrated circuit of the first optoelectronic module is configured to generate the light in response to one or more electrical signals generated by another integrated circuit in the respective stack of the first optoelectronic module.

14. The apparatus of claim 1, wherein the photonic integrated circuit of the second optoelectronic module is configured to modulate the light generated by the photonic integrated circuit of the first optoelectronic module in response to one or more electrical signals generated by another integrated circuit in the respective stack of the second optoelectronic module.

15. The apparatus of claim 4, further comprising an optical coupler supported on the substantially planar substrate;
wherein the plurality of optical modulators are optically coupled to transmit light through the optical coupler; and
wherein the plurality of optical receivers are optically coupled to receive light through the optical coupler.

16. The apparatus of claim 1, further comprising an optical coupler connected to optically couple the photonic integrated circuit of the first optoelectronic module and the photonic integrated circuit of the second optoelectronic module, the optical coupler being a passive optical device selected from an optical-device set consisting of:
a monolithic optical module;
a micro-optic device;
a photonic integrated circuit;
a planar lightwave circuit; and
a 3-dimensional waveguide.

17. The apparatus of claim 1,
wherein each of the two or more electrically interconnected integrated circuits of the first optoelectronic module comprises a respective separately cut die;
wherein each of the two or more electrically interconnected integrated circuits of the second optoelectronic module comprises a respective separately cut die, the respective separately cut dies of the second optoelectronic module being different from the respective separately cut dies of the first optoelectronic module; and
wherein each of the two or more electrically interconnected integrated circuits of the third optoelectronic module comprises a respective separately cut die, the respective separately cut dies of the third optoelectronic module being different from the respective separately cut dies of the first and second optoelectronic modules.

18. The apparatus of claim 17, wherein at least some of the respective separately cut dies are individually packaged.

* * * * *